United States Patent [19]
Greene

[11] 3,905,251
[45] Sept. 16, 1975

[54] HYDRO-MECHANICAL VARIABLE RATIO TRANSMISSION METHOD AND APPARATUS

[76] Inventor: Clarence Kirk Greene, 100 N. Arlington, Reno, Nev. 89501

[22] Filed: May 6, 1974

[21] Appl. No.: 466,873

[52] U.S. Cl. .................. 74/687; 60/406; 60/437; 60/487
[51] Int. Cl.² .................. F16H 47/04; F15B 15/18
[58] Field of Search .......... 74/710, 713, 720, 720.5, 74/730, 687; 60/325, 327, 406, 435, 437, 439, 443, 465, 487

[56] References Cited
UNITED STATES PATENTS

| | | | |
|---|---|---|---|
| 2,296,929 | 9/1942 | Ifield | 60/465 X |
| 3,090,253 | 5/1963 | Linsley et al. | 74/710 X |
| 3,404,584 | 10/1968 | Trautmann | 60/487 X |
| 3,411,381 | 11/1968 | Orshansky | 74/687 |

Primary Examiner—Edgar W. Geoghegan
Attorney, Agent, or Firm—Herbert C. Schulze

[57] ABSTRACT

This is a method and apparatus for the transmission of power wherein the input is converted to a variable output by the use of an Hydro-Mechanical system in which a variable displacement hydraulic pump, in combination with an Hydraulic motor, receives a portion of the input torque and in which the remainder of the input torque is transmitted to the output by mechanical connection and wherein the alteration of the proportion of the input torque being supplied to the output is accomplished by varying the displacement of a variable displacement hydraulic pump activating the hydraulic motor which is coupled to the output.

4 Claims, 9 Drawing Figures

HYDRO-MECHANICAL VARIABLE RATIO TRANSMISSION METHOD AND APPARATUS

BACKGROUND OF THE INVENTION

1. Field of the Invention

This invention is in the general field of power transmission, and more particularly in the field of a transmission system for altering, during operation, the relation of input and output torque and speed.

2. Description of the Prior Art

There are many variable speed transmission arrangements known in the art. In some instances such variable speed transmissions may utilize a differential type gearing arrangement wherein portions of the differential gearing may be driven at variable speeds to alter the output speed. In such cases it is customary to use a variable speed electrical motor or the like to accomplish this variation of the basic input to the basic output speed of the mechanism.

It is also customary to provide for variable speed transmission by the use of cone drives with belts and the like in which the position of the belt on input to output cone is shifted to accomplish the change of ratio.

Another form of such arrangement is exemplified by variable diameter sheave arrangements as are known in the art.

Another form of transmission arrangement is the well known hydro static type transmission arrangement utilized in many appplications such as in automotive, paper, and textile applications.

In the present invention I have combined certain known direct gearing transmission principles with certain known hydrostatic transmission features, together with other principles, to result in a new and unique form of variable transmission system wherein variable displacement hydraulic pump means receives a portion of the torque from the input shaft which is related to the particular displacement being utilized, and transmits such torque to a motor which is connected to the final output in such manner as to affect the torque so distributed and thus the speed. Some features of my unique combination may be found in certain applications, such as in steering mechanisms for track laying vehicles and the like. There is no art known to me utilizing this complete combination for the unusual power transmission result obtained.

SUMMARY OF THE INVENTION

In the field of power transmission and the generation of power, there are certain types of power plants, or engines, or motors, in which the best performance is achieved by maintaining such source of power at a constant speed. Specific examples are steam turbines, gas turbines, certain electrical motors, and the like.

There are numerous devices for varying the speed of output with a constant input speed such as cone drives, certain types of differentials, and other such mechanisms known to those skilled in the art. In each case, however, it is usually customary that the torque may remain constant, or may vary in an unacceptable proportion.

There are, of course, many engines wherein the speed of the input to the transmission may be varied, also. In some such cases, the varying of the speed to the transmission makes some transmissions less than fully effective for converting torque and speed.

It has long been deemed most desirable that a positive, yet infinitely variable transmission, providing for a reversing action without the use of a clutch or the like, be obtained. Up to the present time, such an arrangement has not been possible with the exception of such devices, as known in the art, wherein a disc may be in contact with a wheel, which may pass over the center of the disc and thus reach a point wherein it will reverse. As is understood by those skilled in the art, this type device is not positive and a great deal of slippage occurs with complete, or almost complete, loss of effective torque and power transmission capability. There are other similar devices, and each has essentially the same difficulty, particularly at the point of, or near, the reverse position.

The present invention was conceived and developed as an infinitely variable transmission to include a complete reversing potential and a neutral position, in which torque has not been lost, but, which position involves the "locking" of the output. This has been accomplished by the application of unique hydraulic principles wherein a variable displacement hydraulic pump is uniquely coupled to the input, and an hydraulic motor is coupled to the output. The input is also coupled to a differential gearing type mechanism wherein the torque of the input may be divided between the gearing and the hydraulic system depending upon the displacement of the pump. The changes in the displacement appropriately control the division of torque between the gearing and the hydraulic system and effectively control the speed and direction of the output.

By causing the driving mechanism to impart a portion of its torque directly to the hydraulic pump and a portion of its torque directly to the output drive, and by varying the amounts of torque thus utilized, a combination of change of gearing ratios is accomplished with a smooth and continuously variable output range available. Briefly, the method I utilize involves the carrying of a differential type mechanism connecting the input and output shafts of this transmission. The input shaft essentially drives a planetary gear system in which the planetary gear system is connected by gearing to drive the hydraulic pump and is also connected to gearing fastened to the output shaft, with further gearing connected to the hydraulic motor, also connected to the output shaft.

In one apparatus for the operation of this transmission system, the input shaft activates a planetary gearing arrangement which, by the motion of the planetary gears, drives a sun gear connected to the variable displacement hydraulic pump. Gearing, in the form of an internal gear connected to the output shaft, and also driven in contact with the planetary gears further alters the relationship as a direct function of the action of the hydraulic motor which is receiving its power from the variable displacement hydraulic pump. Thus, the differential motion is imparted by the relative condition of driving of the output shaft by the hydraulic motor, which in turn is dependent upon control of the variable displacement hydraulic pump. By variation of the pressure and the displacement of the variable displacement pump the motion is reversed.

In an important embodiment of the apparatus, a bevel gear differential system is used rather than a planetary system. This arrangement has virtually limitless configurations and combinations as will be seen when reading the descriptions of preferred embodiments.

The method and apparatus comprising this invention has application in virtually all fields of power transmission, and very importantly in automotive, marine, and similar power transmission applications.

It is an object of this invention to provide variable speed transmission method and apparatus utilizing a combination of mechanical gearing together with an hydrostatic transmission.

Another object of this invention is to provide such a transmission having the flexibility of the hydrostatic transmission with the reduced cost, and the greater efficiency of mechanical gearing by a combination of the features of both.

Another object of this invention is to provide a variable speed transmission which is infinitely variable and reversible.

Another object of this invention is to provide a device of the type described utilizing a variable displacement hydraulic pump arrangement.

Another object of this invention is to provide a variable speed transmission of the type described suitable to receive a constant or variable input speed and power and to convert the same smoothly through differential gearing controlled hydraulically.

Another object is to combine the high efficiency and low cost of mechanical gearing with the flexibility afforded by an hydraulic system in a transmission method.

The foregoing and other objects and advantages will be clear to those who are skilled in the art upon reading the following description of a preferred embodiment in conjunction with the appended drawings.

DESCRIPTION OF A PREFERRED EMBODIMENT

Figure 1:
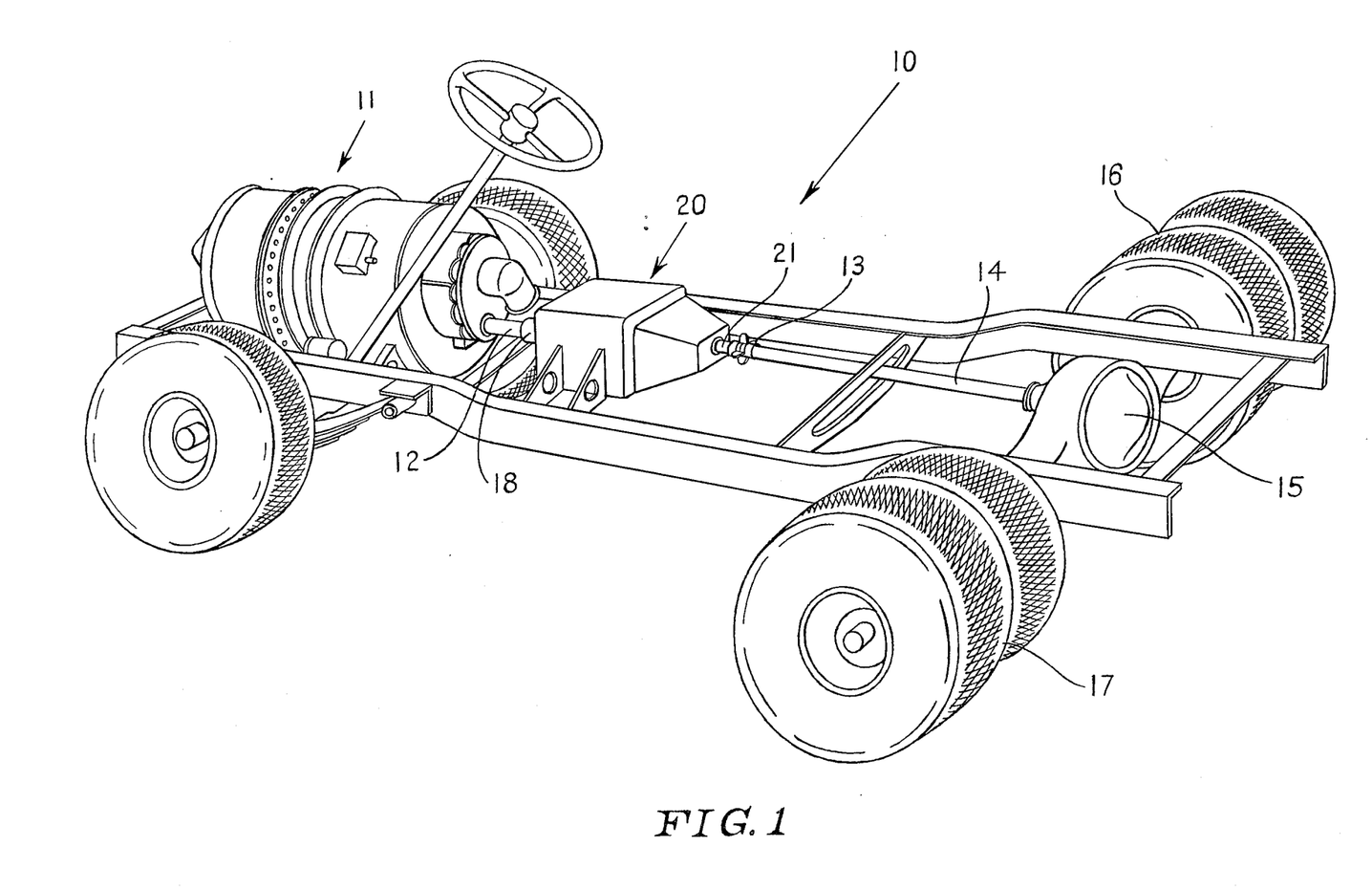
FIG. 1 is a perspective schematic drawing of an automotive truck chassis incorporating a transmission suitable to practice the method of this invention.

FIG. 1 illustrates diagramatically and schematically important elements of an automotive type vehicle generally disignated 10, powered by an engine 11, such as a constant speed turbine engine or the like and having an output shaft 12 connected to a transmission input shaft 18 by customary means. The transmission 20 is provided with an output shaft 21 which is connected by universal joints 13 or the like to the drive shaft 14 of the vehicle. The drive shaft of the vehicle will drive the sets of rear wheels 16 and 17 through a differential mechanism 15 as is known in the art. While FIG. 1 illustrates an automotive type vehicle with a particular type engine, it is to be understood that any engine, motor, or the like, delivering power, whether in conjunction with an automotive type vehicle or other type vehicle, or in any other application, whether or not in conjunction with a vehicle, can be controlled by the transmission method and apparatus of this invention.

Figure 2:
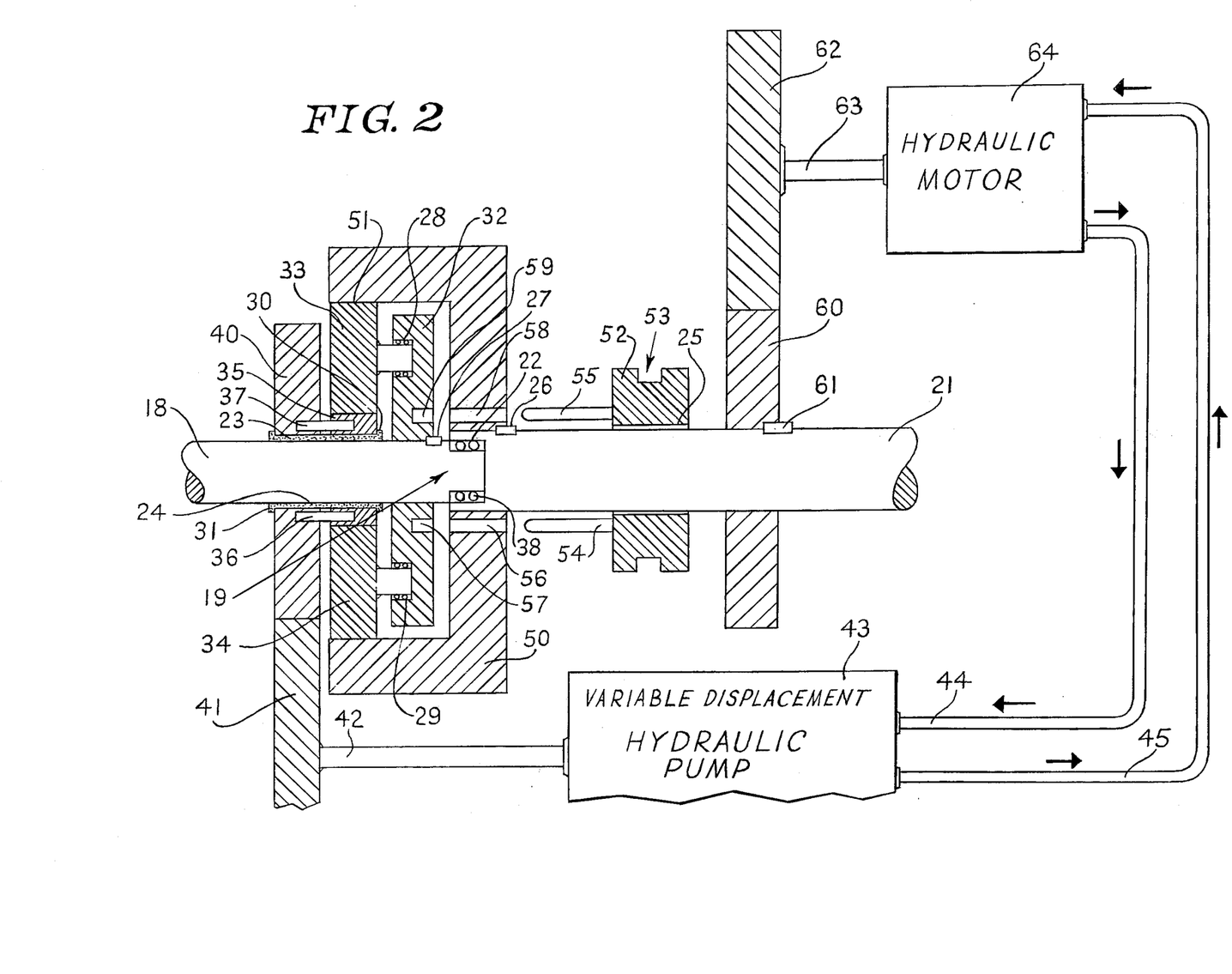
FIG. 2 is a schematic drawing of the elements making up a preferred embodiment of a transmission apparatus suitable to practice the method of this invention, in which certain of the elements are indicated schematically, in section-like representation for clarity and understanding.

With attention directed particularly to FIG. 2 of the drawings, the operation of a device to practice the method of this invention, and thus, the method itself, will be clear. It is understood that FIG. 2 is in a different scale than FIG. 1. Nonetheless, for sake of conformity to the representation of FIG. 1, the input shaft 18 has been given the same numeral and the output shaft 21 the same numeral as in FIG. 1, since this device can be placed within the transmission case and utilized.

It will be noted in connection with FIG. 2 that shaft 18 has a reduced end 19 journaled in appropriate bearings or the like 38 within the socket 22 in the end of the shaft 21. In this manner, the input shaft 18 and the output shaft 21 are in alignment with one another, but may rotate independently of one another.

A sleeve 23, such as of lubricated bronze or the like has been provided so as to provide a bearing surface at 24 against the shaft 18 in order to allow relative rotation between the shaft and the gears mounted upon the sleeve 23 as hereinafter described. The sleeve 23 has been provided with a suitable collar or the like upon one end at 30 and the other end at 31 to retain the elements mounted upon such sleeve within their relative position. A collar, or the like, not shown, may be provided, affixed to shaft 18 on each end of the sleeve 23, in order to prevent the sleeve and the components it carries from moving laterally upon the shaft. Such mechanical construction will be understood by those skilled in the art.

The sleeve 23 has mounted thereon a spur gear 35, which acts as the sun gear in conjunction with planets 33 and 34. Also attached to such sleeve is spur gear 40. Gears 35 and 40 are connected to one another by pins or the like 36 and 37.

The two planet gears 33 and 34 are carried upon shafts appropriately journaled by bearings 28 and 29 within sockets in planet carrier 32. The planet carrier 32 preferably will be in the configuration of a disc or the like and it is to be understood that while two planets have been shown in this illustration there could be, for example, three, or four, or other numbers of planets.

External gear, generally 50, having an overhanging internal gear tooth area 51 will be keyed, or otherwise affixed, to output shaft 21, in a manner such as by key 26.

A gear 41 normally identical to gear 40, and in driving contact therewith, will be fastened to the shaft 42 of a variable displacement hydraulic pump 43.

A pair of like gears 60 and 62 will be so disposed that gear 60 will be fastened to shaft 21 by key arrangement 61, or other suitable means, and will be in driving contact with matching gear 62. Gear 62 will be attached to shaft 63 of hydraulic motor 64. The hydraulic pump and hydraulic motor will be in operative connection with one another by hydraulic lines 44 and 45 in a manner known and customary in the art.

A locking mechanism and arrangement will be provided by which the external gear 50 and the planet carrier 32 may be fixedly connected to one another as desired. There will be two holes such as 57 and 59 provided in the planet carrier and two holes such as 56 and 58, through the thickness of the disc portion of external gear 50, as indicated. - The holes will be so positioned that they may be aligned in such a manner as to allow pins 54 and 55, carried by collar 52, to pass through the holes 56 and 58 and into the holes 57 and 59. In this manner, when the pins are in position in those holes, the external gear 50 and the planet carrier 32 are locked together in order to provide direct connection for the input and output shafts.

The collar 52 has a groove or the like 53 which may be activated by a fork or the like in customary manner. This collar is free of shaft 21 and it will normally have a sleeve 25 or the like to provide an appropriate bearing surface between the shaft 21 and the collar 52 so that the same may be moved independently of, and laterally in relation to, the output shaft 21.

Continuing to focus attention upon FIG. 2, the operation of the device will be clearly understood. Assuming an operation in which the variable displacement hydraulic pump is at zero displacement, it will be understood that there will be no fuild passing between the hydraulic pump and the hydraulic motor. Thus the hydraulic motor will, in essence, be fixed, or locked in position so that the output shaft cannot turn. In this case, and assuming the locking collar device 52 to be in such position that the pins are not engaged, if motion is imparted to shaft 18, it will turn the planets in an orbiting motion and the planets will likewise have rotation upon their own axes since they will in effect be driven by the relative motion between the carrier 32 and the external gear 50 which is now fixed in position. This will impart relative motion to the sun gear 35 in the same direction as the direction of rotation of the input shaft. Due to the motion imparted to the sun gear, and the fact that the sun gear is connected to gear 40, gear 40 will receive motion and will transmit motion to gear 41, which will also transmit motion to variable displacement pump cylinder block (the operation will be understood during the examination of the embodiment shown in FIG. 4) and the device will remain essentially in a neutral position, in which no output is imparted to shaft 21 but in which shaft 21 is locked against movement since the hydraulic motor is inoperative.

In order to provide rotation to shaft 21, the displacement of the hydraulic pump will now be changed. Considering the condition in which positive displacement is imparted to the hydraulic pump, depending upon the amount of displacement, through the action of the hydraulic motor, the same direction of rotation can be imparted to shaft 21 as to shaft 18. It will be observed, that at this state, there will be an added reaction between external gear 50 and planets 33 and 34 and this affects sun gear 35 so as to give a combined output to the output shaft 21 through the mechanically geared differential between the planetary gear arrangement transmitting to the external gear and the torque received from the hydraulic motor.

The torque distribution, and the output speed, will be altered as displacement is increased or decreased.

Returning again to the condition of zero displacement of the hydraulic pump, it will be observed that if the pump receives negative displacement a reverse motion of the shaft 21 will be imparted, as compared to the prior condition of positive displacement.

The relative motion then, depending upon a degree of negative displacement, will again be altered as well as the actual torque conditions as will be understood.

It will now be understood by those skilled in the art that from full positive displacement of the hydraulic pump with a constant input at shaft 18, through zero displacement a range of speeds of the output shaft 21 will take place down to a speed of zero. As the displacement is further changed by going to negative displacement, the direction of rotation of the output shaft will be reversed: In this manner, a full reversing variable speed transmission has been accomplished.

Without affecting this arrangement, the speed of shaft 18 can be varied and in fact if the speed of shaft 18 is varying, the variations can be offset by varying the relationship of this device through the variable displacement hydraulic pump so as to maintain constant speed at the output shaft 21 even though the input speed might be variable.

A question may be raised as to the usefulness of the locking collar 52, since it will be clear that this would not operate properly under conditions of use of the hydraulic system with the gearing system. Such problem is of no consequence, since this locking device is only an emergency feature to be utilized in the event the hydraulic pump and motor arrangement is disconnected for some reason so that under that circumstance, direct connection may be made between the input and output shafts.

Figure 3:
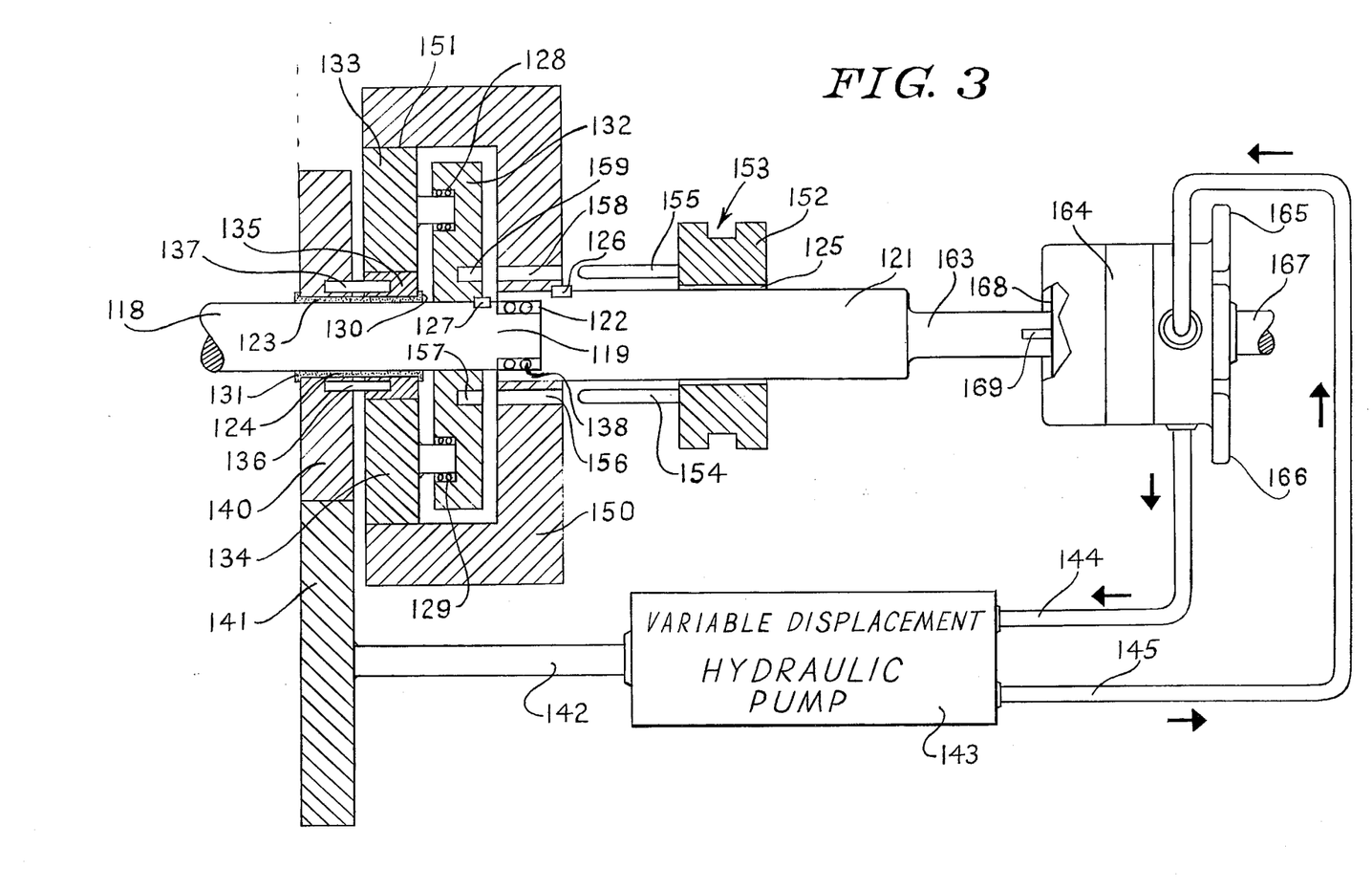
FIG. 3 is an alternate embodiment of an apparatus to practice the method of this invention, depicted in the same manner as FIG. 2.

Attention should now be given to FIG. 3. For sake of ease of understanding, FIG. 3 is generally provided with the same numbering system as FIG. 2, except that all of the numbers have a 1 in front of them. Generally the functions of the numbered elements below 100 are comparable to those of the same value except for the added 1 . For sake of clarity of understanding, the elements will be described briefly and only the new elements of this alternate embodiment will be discussed in detail. Shaft 118 carries planet carrier 132 with planets 133 and 134 appropriately journaled at 128 and 129 in the planet carrier. A key or the like 127 is the connection between input shaft 118 and the planet carrier. The sleeve 123 serves the same function of providing a bearing surface at 124 to shaft 118. Pins 136 and 137 connect sun gear 135 to spur gear 140. The reduced end 119 of shaft 118 is journaled into socket 122, located in the end of shaft 121, by bearings 138. Collars 130 and 131 on sleeve 123 act as retainers.

Gear 141 is driven by gear 140 and is fastened to shaft 142 of variable displacement hydraulic pump 143.

External gear 150 having internal gear tooth contact at 151 with the planet gears is carried on shaft 121 and connected thereto by appropriate keying or the like as at 126.

The collar 152 carrying pins 154 and 155 and having actuation groove 153 is so adapted as to be able to cause said pins to lock within the holes 156, 157, 158, 159 when properly so aligned. This collar is laterally and rotatably moveable upon the shaft 121 by means of a sleeve or the like at 125.

Hydraulic lines 144 and 145 attach variable displacement hydraulic pump 143 by hydraulic means to motor 164.

The motor 164 serves the same function as the hydraulic motor in FIG. 2, but it is to be noted that it will preferably be of the balanced vane type in which the shaft 121 will have a necked down portion at 163 suitable to be inserted through the rotor 168 of the motor and will be fastened to said rotor by appropriate keying 169 or the like. The shaft 163 will extend through the rotor and the portion 167 extending therefrom will be the final output. A mounting flange or the like 165–166 will be provided for appropriate mounting of the motor.

This design has the particular feature that it can be more compactly made, and can utilize the features of a balanced vane type motor having a rotor suitable to carry the output shaft in conjunction therewith as herein indicated.

Except for the difference in structure, this device will operate in precisely the same manner as the embodiment of FIG. 2 and therefore the operation will not be discussed in detail.

Figures 4, 5:
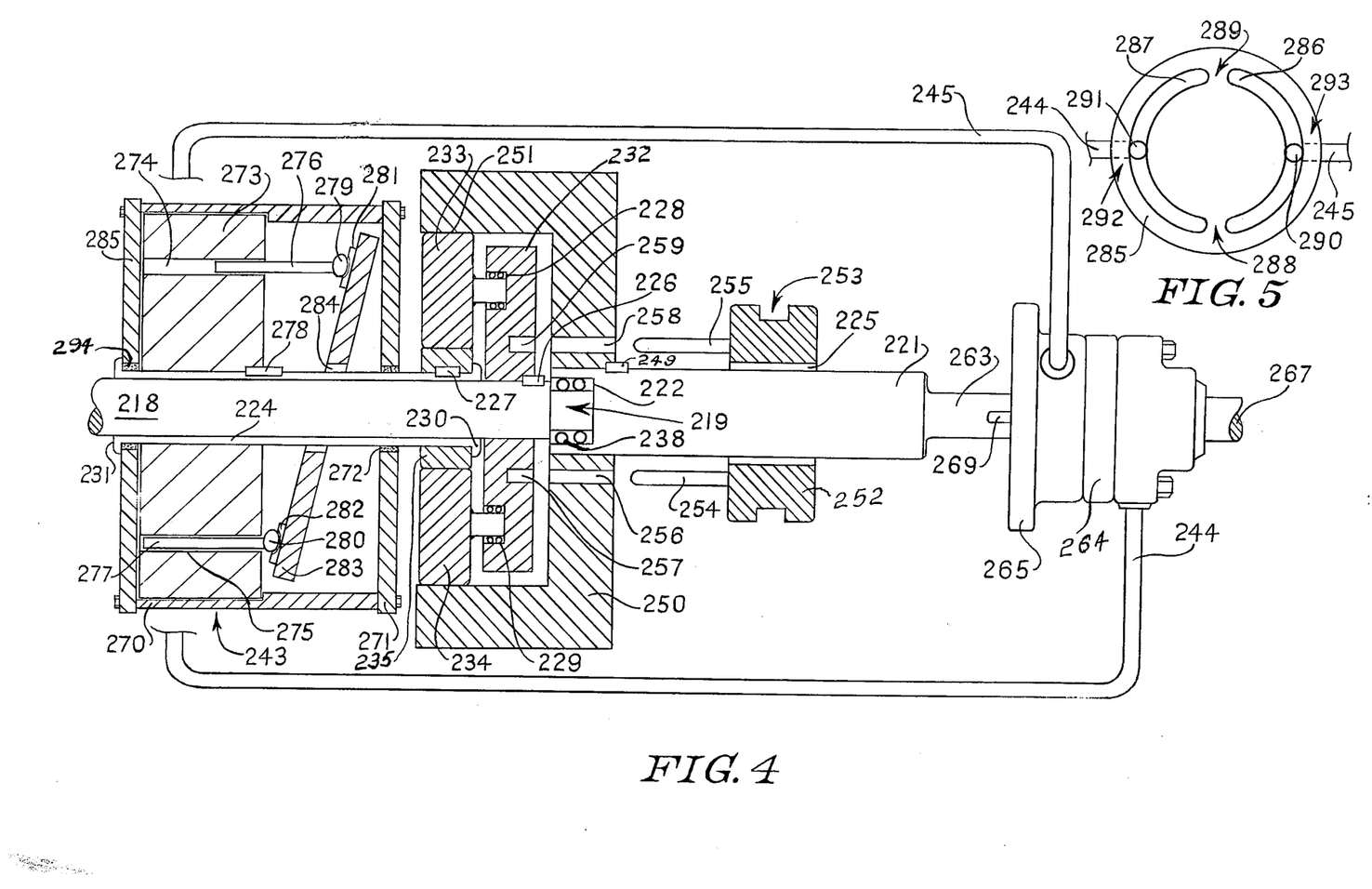
FIG. 4 is another alternate embodiment of an apparatus to practice the method of this invention depicted in the same manner as FIG. 2.
FIG. 5 is a plan view, with certain elements in phantom and in reduced scale, of the end plate of a variable displacement pump of the type utilized in the apparatus illustrated in FIG. 4, wherein particularly the oil pumping conduits are shown.

Attention will now be directed to the embodiment shown in FIGS. 4 and 5. The operation of a particular type varible displacement pump, known as a "Swash Plate" type pump will be described, in conjunction with a balanced vane motor. It will be deemed by many persons that this might be the most desirable form, mechanically, of an apparatus to practice the method of this invention. For this reason, even though many of the elements are similar and their functions the same, as in the prior described embodiment, the embodiment of FIGS. 4 and 5 will now be described.

An input shaft 218 will be connected from the left end shown in the drawing as will be known to those skilled in the art, to an engine, motor, or the like (not shown). The input shaft is fixedly connected to a disc or the like 232 by a key 226, or in other suitable manner. The end of the input shaft 218 is reduced in size at end 219 and journaled in bearing 238 within socket 222 in output shaft 221. The journaling in this manner makes an ideal package and an "in-line" output-input shaft arrangement.

The carrier disc 232 carries a pair of planetary gears 233 and 234 on short axles journaled in bearings 229 and 228 carried within the carrier disc.

The planetary gears are in driving contact and relationship with sun gear 235. Sun gear 235 is fixedly connected by key 227 or the like to a sleeve or the like 224.

The sleeve 224 will be, preferably, oil impregnated bronze or similar material such that it will automatically be a proper bearing surface upon input shaft 218 so that it can rotate freely around the shaft. Obviously some other arrangement, such as bearings or the like, could be used to accomplish this result. The sleeve 224 is also connected to cylinder block 273 of a variable displacement hydraulic pump, generally 243. The connection to the cylinder block may be by a key or the like 278.

A pair of flanges 230 and 231 are provided to avoid lateral movement of sun gear and pump arrangement, and an additional pair of collars (not shown) may be provided at either end and adjacent each flange which collars may be fastened to shaft 218 to prevent movement of the sleeve laterally on the shaft. This can be accomplished in other customary manner. Such collars or the like have not been shown, since they are well known in the art. It will now be clear, that the cylinder block 273 and the sun gear will be locked together by the sleeve 224 upon which they are carried, and will always rotate together.

The output shaft 221 has a necked down portion 263 which passes through the rotor of vane motor or the like 264. An appropriate key or the like 269 will be used to fasten this shaft to the rotor of the motor and this construction will be known to those skilled in the art. The necked down portion will continue through the motor and emerge, with the end 267 being connected to whatever final output or driven device may be desired. The motor 264 will be appropriately mounted by a mounting flange or the like 265 in a manner known to those skilled in the art.

The output shaft 221 has fastened to it by key or the like 249, an external gear having internal gear teeth at area 251 wherein the teeth are in driving contact with the planetary gears 233 and 234.

A locking arrangement, by which the external tooth gear 250 and the planet carrier 232 maybe locked together has been provided. This is not normally used in operation, but it is provided as a means of directly coupling the input and output shafts if desired for reason of inoperativeness of the hydraulic system which will be hereinafter described, or for whatever reason. This locking arrangement is composed of a collar 252 having a groove for moving it laterally upon shaft 221. Groove 253 is suitable to be used by a shifting fork or the like. An appropriate bearing, such as a bronze sleeve or the like 225 is provided so as to accomplish both lateral and rotational movement of the collar with respect to shaft 221. A pair of pins 254 and 255 have been provided, suitable to enter into and pass through holes 256 and 258 through external gear 250 and to enter holes 257 and 259 in planet carrier 232, to accomplish the locking of the two elements together when desired.

The external gear 250, the output shaft 221, and the rotor of the motor 264 will, in normal operation, turn together; the input shaft 218 and the planet gear carrier 232 will turn together; and the sun gear 235 and the cylinder block 273 of the pump will turn together. These arrangements and their interrelation to accomplish the drive and transmission arrangement contemplated will be understood by thorough examination of the drawings and the description of the operation which will follow.

Before describing the operation, it will be well to have an understanding of the method of operation of the variable displacement hydraulic pump, generally 243, of this type.

The variable displacement pump, in a most simplified schematic descriptive form, is illustrated. It has been illustrated in this manner so that persons can understand the theory of operation although it is understood that those skilled in the art will be thoroughly familiar with the methods of construction such as that shown as well as other variable displacement pumps.

The pump 243, consists of a casing 270 which is essentially a cylinder. Two end plates 271 and 285 are attached to the end of casing 270 so as to provide essentially a closed cylinder. An appropriate oil seal or the like 272 will be provided about sleeve 224 and within an appropriate opening in end plate 271. A similar oil seal 294 is provided for the end plate 285. It will be noted that the casing 270, as illustrated, shows a shoulder arrangement on the interior for the purpose of retaining the cylinder block 273 between the shoulder and the end plate 285. Clearance has been indicated all the way around in order to indicate that the cylinder block is free to move. In practice, this clearance will be very close and appropriate seals and the like will be provided as known to those skilled in the art to prevent oil leakage at various points.

As illustrated in the drawing, in schematic section, two cylinders, 274 and 275 are shown. It is clear that various numbers of cylinders might be used, although it is customary to use, for example, eight cylinders in an arrangement of this nature. The cylinders are merely holes extending all of the way through the cylinder block, and each cylinder has a piston such as 276 and 277 respectively in this drawing. The piston in each case is little more than a straight, round rod of approximately the diameter of the cylinder and of appropriate length, as will be understood by those skilled in the art, such that the piston does not contact the end plate 285 at its maximum stroke, nor does it slip from the cylinder at its maximum withdrawal. Each piston will terminate with a ball and socket joint arrangement as at 279 and 280 (not shown in detail, but understood by those skilled in the art), which is affixed to a glide plate appropriate to glide about the surface of swash plate 283. The swash plate is little more than a large washer-like arrangement having a suitable hole in the center at 284 so as to not come into contact with the sleeve 224 at maximum tilt of the swash plate. The swash plate will be carried on trunnions (not shown) within the casing 270. The trunnion arrangements will be at the interior of the casing on the z axis and will tilt from the y axis and about the z axis as will be clear to those skilled in the art.

It will be clear that the pistons 276 and 277 together with their ball joints and glide plates 279–281 and 280–282 respectively will be of customary construction including, normally, a lubrication hole or the like through the center in a manner known to those skilled in the art and not illustrated. Also, a bath of oil or the like may provide the desired lubrication.

Attention should now be given to FIG. 5 in order to understand the method in which oil is pumped by this type pump. FIG. 5 is an illustration of the interior of plate 285, in which the scale has been altered from the scale of FIG. 4 in order for clarity of understanding, and in which the center hole and oil seal is not shown.

A pair of arcuate slots 286 and 287 are provided to a suitable depth within the plate 285 but without going through the plate 285, so as to provide channels in which oil may accumulate and flow. The arcuate slots are of the exact width of the diameter of the cylinders of the particular pump being used. A pair of spaces are provided between the two arcuate slots at 288 and 289, each of the spaces being that dimension at its narrowest position which is exactly the diameter of one cylinder.

A pair of holes 290 and 291 are provided to interconnect to hose connections for further connection to hydraulic hoses 244 and 245 which thus connect the output of the pump and the return to the pump with the input of the motor and return from the motor respectively. The details of construction will be understood by those skilled in the art.

In describing the operation of this particular unit, it will be clear that when the input shaft 218 rotates, the carrier 232 will rotate with it, and will cause the planets to move and to rotate on their own axes due to the driving contact with external gear 250 and sun gear 235.

If a condition is assumed wherein the swash plate is in the exact vertical position, it will be observed that if the sun gear turns (and with it the cylinder block) that there will be no motion imparted to the pistons as they glide about in contact with the swash plate. Under this circumstance, the rotor of the motor 264 will be unable to turn, and output shaft 267 will be in a fixed position with no rotation. The planet gears will thus be turning in contact with the stationary external gear and will impart rotation in the same direction of rotation as the input shaft to the sun gear and cylinder block.

When a tilt is given to the swash plate, as shown in the illustration, it will be clear that as the cylinder block turns, the pistons will be forced in or out of the cylinders by their gliding contact with the swash plate. As they are forced into the cylinders during this operation, they will force oil through the appropriate arcuate slot and thus through the appropriate hydraulic line so as to cause the rotor of motor 264 to turn. In turning, the rotor is now imparting a degree of motion to the external gear 250, and a change of relative rotation between the sun gear, the planets and the external gear obviously takes place. There is now a distribution of the torque and speed between the gearing arrangement and the hydraulic arrangement such that a portion of the torque is transmitted directly to the output through the hydraulic system. As the tilt gradually increases from zero to full tilt, the distribution of the forces will be altered and thus the output speed and torque will be altered during this transitional period.

It is interesting to note that when a reverse tilt takes place (that is when the swash plate passes through its position of zero tilt to a negative tilt) wherein the upper portion of the swash plate as shown in the illustration approaches the cylinder block, the forces of the pump will, of course, have reversed direction and a reversed direction will take place in the output shaft 221 due to the reversing of motor rotor and thus of the differential gearing arrangement.

It will be clear to those who are skilled in the art that the speed relationships and the like can be materially changed by altering the gear ratios of the planet, sun and external gears. Thus any desirable characteristics can be achieved.

It should be stressed that it will not make any difference to the operation of this arrangement if the input shaft should be of a varying speed. The varying speed can be accommodated and can be controlled to a constant output speed if desired by appropriate control of the tilt position of the swash plate, as will be clear to those skilled in the art.

The embodiments shown in FIGS. 6, 7, 8 and 9 all contain identical elements and are believed in many respects to be the most preferred apparatus for practicing the method of this invention. In these illustrations a bevel gear type differential mechanism is utilized, wherein the basic differential mechanism consists of two large bevel gears 311 and 325, in driving contact with smaller pinion bevel gears 322 and 323. The two pinion bevel gears are rotatably mounted upon a spider 321 which can be a plate, a shaft, or other type carrier which is known to those skilled in the art. At each end of the carrier and particularly on the end of the shafts upon which the pinions are mounted, there will be suitable retaining nut or other arrangmenent 337 and 336 respectively. These retainers are so disposed and arranged as to maintain the pinions in driving contact with the larger bevel gears.

The construction of a basic differential mechanism of the type now described is well known to those skilled in the art and may take many different forms. The basic form shown here is particularly suitable for practicing the method of this invention.

Figure 6:
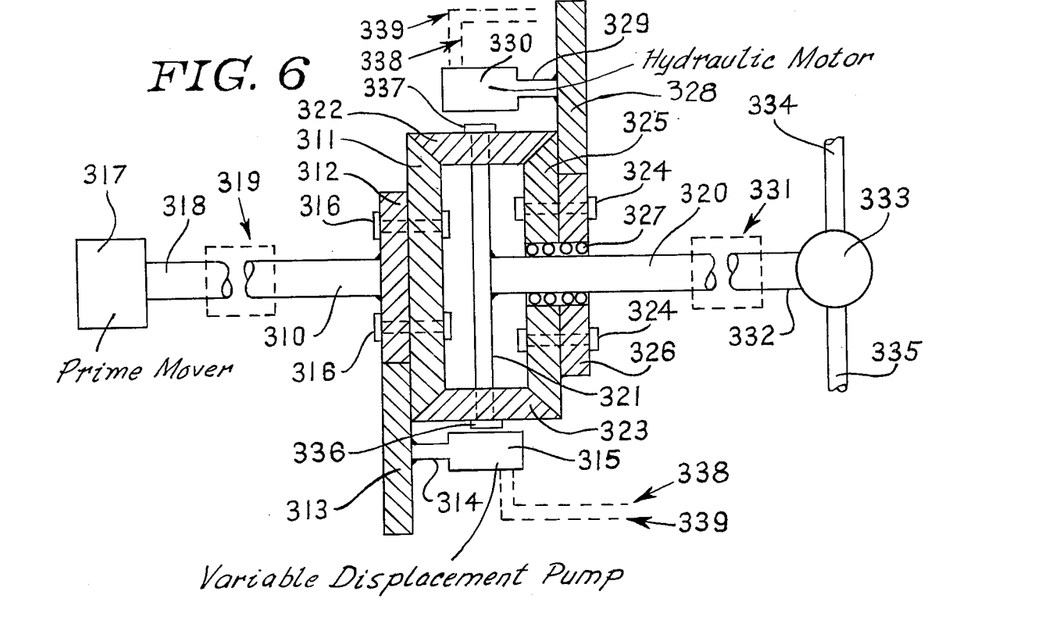
FIG. 6 is an alternate embodiment of an apparatus to practice the method of this invention depicted in the same manner as FIG. 2.

Fastened to the bevel gear 311 is a spur gear 312 which is held in place by suitable bolt and nut arrangements, or rivets, 316. Thus the bevel gear 311 and the spur gear 312 will travel and rotate together. A spur gear 326 is fastened to bevel gear 325 by suitable bolts or rivets or the like 324 in a like manner and thus the bevel gear 325 and the spur gear 326 will always rotate together. A spur gear 328 is in driving contact with spur gear 326. In each case, the relationship of the spur gears may be equal, as is shown, and as will be desirable for most purposes, but by a change of the ratios of these spur gears, different relationships will occur, as will become clear to those skilled in the art upon reading the rest of this description and the description of the operation together with a study of the drawings.

It will be observed that a shaft 320 is fixed to the spider or carrier 321. Thus it will be observed that when the shaft 320 turns, the pinions 323 and 322 will orbit about the large bevel gears 311 and 325.

It will further be observed, that the spur gear and pinion combination 325–326 is journaled upon the shaft 320 by appropriate bearings or the like 327. Not shown, but, to be understood by those skilled in the art, are certain details such as retainers upon the shaft 320 to prevent lateral movement of the bevel gear and spur gear combination 325–326.

The shaft 314 of variable displacement hydraulic pump 315 is fastened to the center of spur gear 313, so that motion of spur gear 313 will drive the shaft and thus impart power to the variable displacement pump 315.

An hydraulic motor 330 has its shaft 329 affixed to the center of spur gear 328 so that movement of the hydraulic motor will impart the same movement to spur gear 328. A shaft 310 is connected to spur gear 312 at its center position, thus rotation of shaft 310 and that of the bevel gear spur gear combination 311–312 will always be equal.

The hydraulic motor and the variable displacement hydraulic pump will have customary hydraulic lines connecting them so that the hydraulic fluid under pressure from the pump will drive the motor, and the other line is provided for the return of the hydraulic fluid from the motor to the pump in a manner known to those skilled in the art. Such hydraulic lines have been partially indicated by the phantom lines 338 and 339.

An engine, or other source of power 317 having a power output shaft 318 is connected by a suitable coupling or the like 319 to the shaft 310. The details of engines or other power sources and couplings are well known to those skilled in the art and need no explanation.

Shaft 320 is connected by appropriate coupling or the like 331 to a power output shaft or the like 332. This power output shaft 332 will be utilized for final application of the power from this transmission arrangement such as by passing through an automotive differential arrangement 333 and to automotive axle 334 and 335. Other power outputs and takeoffs, obviously would be suitable and there is not meant to be any limitation as to an output. This illustration is merely for graphic illustration of the ultimate end use which might be achieved.

Figure 7:
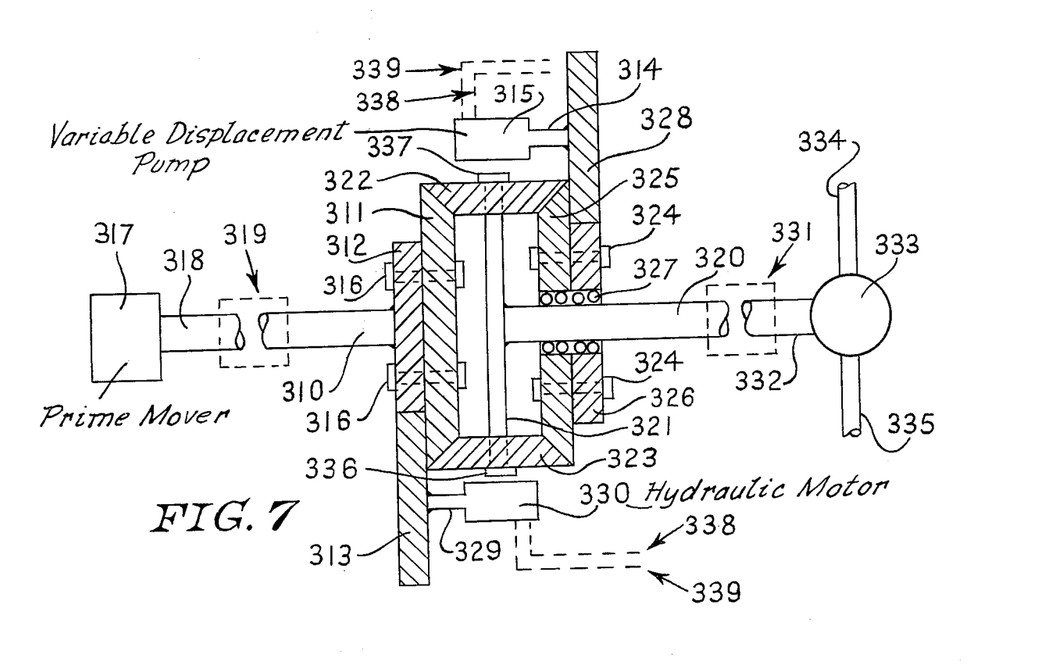
FIG. 7 contains the same elements of the embodiment shown in FIG. 6 but with an alternate connection and location of the hydraulic pump and motor.

Turning particular attention to FIG. 7, it will be observed that only one change has been made compared to the view of FIG. 6. In this case, the variable displacement pump 315 is fastened by its shaft to spur gear 328, and the hydraulic motor 330 is fastened by its shaft 329 to the spur gear 313.

Figure 8:
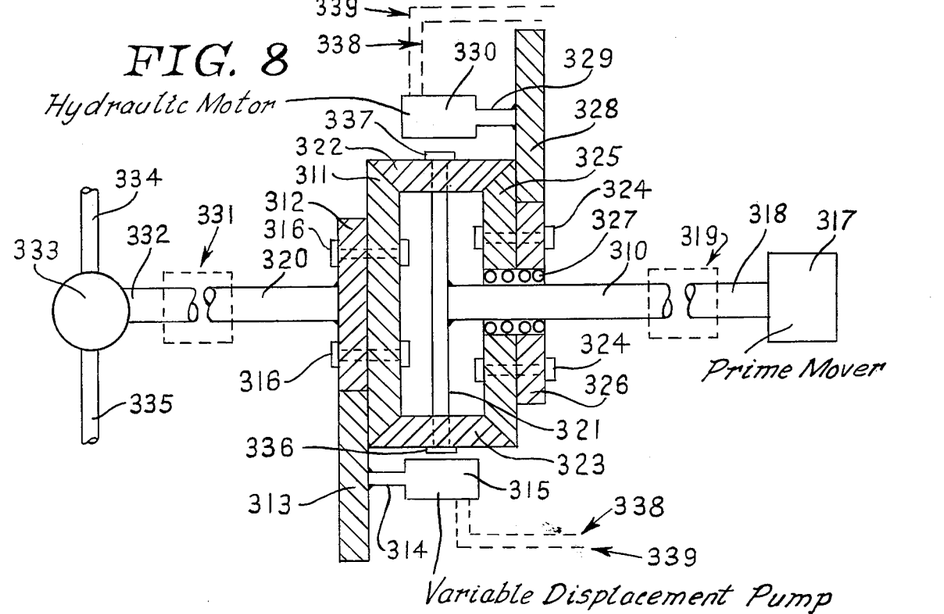
FIG. 8 depicts the same elements as FIG. 6 with the input and output power reversed.

With attention to FIG. 8, it will be observed that the only change from the arrangement of FIG. 6 has been to fasten the input shaft 310 to the spider or pinion carrier 321 (with power source and shaft and coupling appropriately relocated). The output from this transmission, 320, is shown to be connected to spur gear 312, (and the final output, coupling and the like relocated).

Figure 9:
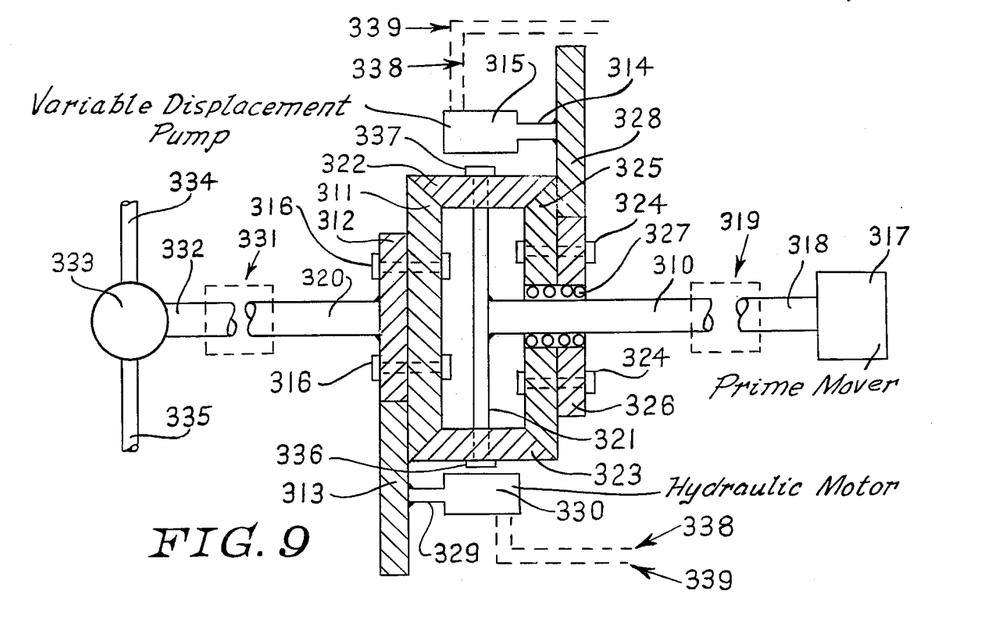
FIG. 9 depicts the same elements as FIG. 7 with the input and output power elements reversed.

FIG. 9 is identical to FIG. 8 with the exception that once again the location of the variable displacement pump with its shaft have been substituted so that the pump 315 is fastened by its shaft 314 to spur gear 328, while the motor 330 has been placed in connection with spur gear 313 by its shaft 329.

The versatility of this system is well illustrated by the four different combinations which can be interchangeable if desired within a single unit. Turning attention to FIG. 6, it will be observed that when input power is delivered to shaft 310, that the spur gear 312 and the bevel gear 311 will receive the identical rotation. Assuming a condition, where the variable displacement pump is at a zero displacement, the spur gear 313 will turn against no pressure whatsoever and the motor 330 will, of course, be in a stationary position since no oil can move. Thus the bevel gear and spur gear combination 324–325 will remain completely stationary and the pinion gears 322 and 323 will be carried on their carrier 321 at that speed which is imparted by reason of their motion through being driven in one direction by bevel gear 311, and, in essence, "walking" around the stationary bevel gear 325. Thus the output will be that ratio which will depend upon the exact ratio of the gearing.

At full displacement of the pump 315, the motor 330 will be turning at essentially the identical rate of rotation as the pump and thus, through the differential action, the pinions 322 and 323 will be standing still, since the bevel gears 311 and 325 will be moving at the same rate of speed in opposite directions.

By varying the relationship and displacement of the variable displacement pump, it will be clear that different output ratios of speed and torque will be supplied.

Examining now the changed arrangement illustrated in FIG. 7, it will become apparent that this mechanism becomes, in effect, a braking mechanism. If the variable displacement pump is at zero displacement, it will be clear that the bevel gear spur gear arrangement 311–312 can not turn and thus with no power being imparted to the input shaft there would be what would amount to free-wheeling of the output. By gradually increasing the displacement of the variable displacement pump, motion would gradually be imparted to the spur gear 313 and thus to the bevel gear 311 and 312. It will be clear that the ultimate condition of a full stop to the output would be at that point where there was full displacement and equal movement between the pump and motor shafts.

FIG. 8 now illustrates the condition where the input power is directed to the pinions. In this case, assuming a zero displacement condition of the variable displacement pump, there will be a condition where the bevel gear spur gear combination 325–326 will have no movement, and thus the pinions will "walk" about bevel gear 325 and impart that motion which is dependent upon the gear relationship between the pinions and the large bevel gears to the output.

At full displacement, it will be seen that a condition of no motion should exist.

With attention given to FIG. 9 we will see a condition where, with no pump displacement, there will be no output, and the pinions 322 and 323 will be orbiting freely about bevel gear 311 which will be stationary.

At full displacement, the bevel gears 311 and 325 will be turning essentially in opposite directions at the same speed. But, since there is input to the pinions, the situation will exist where in fact a multiplication of the effect may exist.

The combinations and permutations with the embodiments shown in FIGS. 6, 7, 8 and 9 are limitless, since we have not even discussed negative displacement of the pump nor have we discussed the situation where the direction of the motor and pump are reversed and/or are the same.

The situation regarding negative displacement of the variable displacement pump has such particular possibilities that it should be commented upon in expressing the potential for this device. It will be clear to those skilled in the art that in each and all of the situations shown in FIGS. 6, 7, 8 and 9, that a reversal of the entire direction of rotation of the input compared to the output will take place when negative displacement is used as opposed to positive displacement. Thus, although not commented on, at length, this is an ideal reversing mechanism for certain automotive vehicles.

Another manner in which the directions of the relative rotation of input and output can be altered is where the lines connecting the pump and motor are switched. This can be done in a very simple and easily controlled manner by utilizing four-way hydraulic valves in the lines 338 and 339 so as to enable a cross-over of fluid flow in said lines. While not illustrated, all persons who are skilled in the hydraulic arts are familiar with the use of four-way valves in hydraulic lines and will observe that direction of rotation can be altered by interchanging the hydraulic lines 338 and 339 and also such persons as are skilled in the hydraulic arts will recognize the ease with which negative displacement and positive displacement of the variable displacemennt pump can be utilized either independently or in conjunction with the interchanging of the connections of lines 338 and 339 between themselves so as to accomplish a wide range of reversing and speed relationships.

Anyone skilled in the art, with this revelation to them, can examine the limitless possibilities and apply their own special formulas and requirements. It will be seen that this has become the most versatile transmission presently known.

It should be noted that throughout this description, leakage, friction and the like have been ignored, but such factors are understood and do not effect the theory of the operation except in a mechanical sense, for which those skilled in the art can compensate.

While the embodiments of this invention shown and described are fully capable of achieving the objects and advantages desired, it should be understood that the embodiments shown and described are purely for purposes of illustration and not for purposes of limitation.

I claim:

1. A power transmission comprising: a bevel gear differential consisting of a first pair of parallel bevel gears at a spaced distance from one another, a second pair of parallel bevel gears in driving engagement with said first pair of bevel gears, and at a perpendicular relationship thereto, said second pair of bevel gears being carried by a carrier, and journaled on a first and second shaft upon said carrier; a third shaft connected to said carrier; a first spur gear connected to one of said bevel gears, said first spur gear and the bevel gear to which it is connected being journaled upon said third shaft; a second spur gear fastened to said other member of said first pair of bevel gears; a fourth shaft fastened to said second spur gear; a third spur gear in driving contact with said first spur gear; an hydraulic motor connected to said third spur gear; a fourth spur gear in driving connection with said second spur gear; a variable displacement hydraulic pump connected to said fourth spur gear; hydraulic connections between said hydraulic pump and said hydraulic motor; input power means connected to said fourth shaft; and power load means connected to said third shaft.

2. The apparatus of claim 1 wherein the said pump means is connected to said third spur gear in place of said motor, and said motor is connected to said fourth spur gear instead of said pump.

3. The apparatus of claim 1 in which said third shaft is connected to said second spur gear in place of said fourth shaft, and in which said fourth shaft is connected to said carrier in place of said third shaft.

4. The device of claim 3 in which said hydraulic pump is connected to said fourth spur gear in place of said hydraulic pump, and said hydraulic pump is connected to said third spur gear in place of said motor.

* * * * *